US006421211B1

(12) United States Patent
Hawwa et al.

(10) Patent No.: US 6,421,211 B1
(45) Date of Patent: Jul. 16, 2002

(54) DISK DRIVE ACTUATOR ARM WITH MICROACTUATED READ/WRITE HEAD POSITIONING

(75) Inventors: Muhammad A. Hawwa; Jamshid Bozorgi, both of Fremont, CA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/938,084

(22) Filed: Aug. 23, 2001

Related U.S. Application Data

(62) Division of application No. 09/421,995, filed on Oct. 20, 1999.

(51) Int. Cl.[7] .............................................. G11B 5/596
(52) U.S. Cl. .................................................... 360/294.4
(58) Field of Search ........................... 360/294.4, 294.6

(56) References Cited

U.S. PATENT DOCUMENTS

| | | | |
|---|---|---|---|
| 4,169,276 A | | 9/1979 | Rodal |
| 5,764,444 A | | 6/1998 | Imamura et al. |
| 6,052,251 A | * | 4/2000 | Mohajerani et al. ...... 360/294.4 |
| 6,118,637 A | * | 9/2000 | Wright et al. ............ 360/294.4 |
| 6,157,522 A | * | 12/2000 | Murphy et al. .......... 360/294.4 |
| 6,201,668 B1 | * | 3/2001 | Murphy ................... 360/294.4 |
| 6,320,730 B1 | * | 11/2001 | Stefansky et al. ........ 360/294.4 |

OTHER PUBLICATIONS

U.S. patent application Ser. No. 09/938,088, Hawwa et al., co–pending application.

Mori, T., Munemoto, T., Otsuki, H., Yamagushi, Y., Akagi, K., "A Dual–Stage Magnetic Disk Drive Actuator Using a Piezoelectric Device For A High Track Density," IEEE Trans. On Mag., vol. 22, No. 6, pp. 5298–5302, May 1996.

Nakamura, S., and Fujita, H., "Application of Micromachine Technology To Hard Disk Drives," IEEE Trans. On. Mag., vol. 34, No. 2, pp. 477–479, Mar. 1998.

Soeno, Y., Ichikawa, S., Tsuna, T., Sato, Y., and Sato, I., "Piezoelectric Piggy–Back Microactuator For Hard Disk Drive," APMRC, Singapore, Jul. 29–31, 1998.

Takaishi, K., Imamura, T., Mizoshita, Y., Hasegawa, S., Ueno, T., and Yamada, T., "Microactuator Control For Disk Drive," IEEE Trans. On Mag., vol. 32, No. 3, pp. 1863–1866, May 1996.

Tang, Y., Chen, S.X., and Low T.S., "Micro Electrostatic Actuators in Dual–Stage Disk Drives With High Track Density," IEEE Trans. On Mag., vol. 32, No. 5, pp.3851–3853, Sep. 1996.

(List continued on next page.)

Primary Examiner—Robert S. Tupper
(74) Attorney, Agent, or Firm—Carr & Ferrell LLP

(57) ABSTRACT

The present invention is embodied in an actuator arm which is mounted to a primary actuator. The primary actuator positions the actuator arm, with a read/write head mounted to the actuator arm, across a data storage disk. The actuator arm comprises an inboard portion, an outboard portion and a pair of bimorph actuators. The inboard portion has a longitudinal axis and is attached to the primary actuator. The outboard portion has the read/write head mounted onto it. The pair of bimorph actuators are deflectable together in a common direction and are connected between the inboard and the outboard portions. Upon deflection of the bimorph actuators in the same direction, the outboard portion is translated along an at least nearly straight line transverse to the longitudinal axis of the inboard portion. This transverse motion allows the read/write head to be kept substantially within a plane parallel to the surface of the data storage disk, preventing damage caused by possible contact between slider and the disk surface from rolling the slider due to out-of-plane motions. Further, the use of bimorph actuators provide increased displacements of the read/write head. Also, since the head displacement is not a function of microactuator's position along the actuator arm, the actuator arm can be shorter, allowing for use in compact disk drives.

12 Claims, 5 Drawing Sheets

OTHER PUBLICATIONS

Tang, W. Miller, R. Desai, A., Tamesvary, V., Wu, S., Hsieh, W., Tai, Y., and Miu, D., "Silicon Micromachined Electromagnetic Microactuators For Rigid Disk Drives," IEEE Trans. On Mag., vol. 31, No. 6, pp. 2964–2966, Nov. 1995.

Brown, Chappell, "Mini Laser Scanners Built With MEMS," IEEE Times, Issue 1007, May 18, 1998.

Evans, R., and Carlson, P., "Two–Stage Microactuator Keeps Disk Drive On Track," Components, pp. 43–44, Apr. 1998.

Evans, R., Griesbach, J., and Carlson, P., "Microactuation White Paper," Hutchinson Technology, Inc., pp. 1–7, Sep. 3, 1998.

Evans, R. and Griesbach, J.S., "Piezoelectric Microactuator For Dual Stage Control," APMRC, Singapore, Jul. 29–31, 1998.

Guo, W., Huang, T., Bi., C., Chang, K.T. and Low, T.S., "A Bandwidth Piezoelectric Suspension For Hightrack Density Magnetic Data Storage Devices," APMRC, Singapore, Jul. 29–31, 1998.

Guo, W., Weerasooriya, S., Goh, T.B., Li, Q.H., Bi, C., Chang, K.T., and Low, T.S., "Dual Stage Actuators For High Density Rotating Memory Devices," IEEE Trans. On Mag., vol. 34, No. 2, pp. 450–455, Mar. 1998.

Horsley, D., Horowitz, R. and Pisano, A., "Dual Actuators Solve Track–Density Dilemma," Data Storage, pp. 17–18, 20, Apr. 1999.

Imamura, T., Koshikawa, T., and Katayama, M., "Transverse Mode Electrostatic Microactuator For MEMS–Based HDD Slider," IEEE, pp. 216–221, Jun. 1996.

Information sheet depicting "aTSA Magnum 5E," Hutichinson Technology, Inc., Sep. 17, 1999.

Koganezawa, S., Uematsu, Y., and Yamada, T., "Dual–Stage Actuator System For Magnetic Disk Drives Using a Shear Mode Piezoelectric Microactuator," APMRC, Singapore, Jul. 29–31, 1998.

Koganezawa, S., Takaishi, K., Mizoshita Y., Uematsu, Y., Yamada, T., Hasegawa, S., and Ueno, T., "A Flexural Piggybakc Mili–Actuator For Over 5 Gbit/in.2 Density Magnetic Recording," IEEE Trans. On Mag., vol. 32, No. 3, pp. 3908–3910, May 1996.

* cited by examiner

DISK DRIVE ACTUATOR ARM WITH MICROACTUATED READ/WRITE HEAD POSITIONING

This application is a divisional of copending U.S. Application Ser. No. 09/421,995 filed on Oct. 20, 1999, and claims priority therefrom pursuant to 35 U.S.C. 120.

BACKGROUND OF THE INVENTION

Computer disk drives store and retrieve data by using a magnetic read/write head positioned over a rotating magnetic data storage disk. The head writes data onto the disk by aligning magnetic poles set in concentric tracks on the disk. The width of the tracks depends on the width of the read/write head used. The narrower the tracks can be made, the more data which can be stored on a given disk. As the size of read/write heads have become progressively smaller in recent years, track widths have decreased. This decrease has allowed for dramatic increases in the recording density and data storage of disks.

In a typical disk drive, the magnetic head is supported and held above the disk surface by an actuator arm. By moving back and forth, the actuator operates to position the head above the disk to read or write data on a desired track. The actuator arm is typically moved by a voice coil motor (VCM) acting as a primary actuator. The problem which has arisen as track widths have decreased, is that the limits of the VCM's positioning precision have begun to be reached. This limited precision has made it increasingly difficult to achieve accurate head positioning. As such, a need has arisen for a means to more precisely position read/write heads.

One approach to achieving finer head positioning has been to employ a secondary actuator to operate together with the primary actuation provided by the VCM. This approach involves placing a microactuator along the length of the actuator arm and configured the arm so the microactuator moves a portion of the arm containing the read/write head. Specifically, the head suspension assembly (HSA) of the actuator arm is divided into a fixed portion and a movable portion. Microactuators are connected between the two portions and positioned to be capable of moving the movable portion of the HSA. Thus, the VCM acts as a coarse actuator and the microactuator as a fine actuator.

Commonly, the microactuators have utilized piezoelectric materials which vary their length when a voltage is applied to them. As shown in FIG. 1, a widely used configuration is an actuator arm 2 which has two piezoelectric actuators 4 mounted between the base plate 6 and the load beam 8. The piezoelectric actuators 4 are positioned about a hinge 7 separating the base plate 6 and the load beam 8.

In this arrangement, the actuators 4 act in a 'push-pull' manner to move the load beam 8 relative to the base plate 6. That is, as one actuator 4 constricts and pulls the load beam 8 in the desired direction, the opposing actuator 4 expands to push the load beam 8 in the same direction. At the outboard end of the load beam is mounted a slider 9 which carries a read/write head. As can be in FIG. 1, the actuator arm 2 holds the slider 9 above a disk and by swinging side-to-side, move the slider 9 over the surface of the disk. In turn, the slider 9 positions the read/write head just above the disk surface by flying in the thin airflow layer created by the rotating disk. In so doing, the slider and the head are both kept very close to the disk surface. As the actuator arm 2 is swung back and forth, the movement imparted to the slider 9 is in a plane parallel to the plane of disk's surface. As such, the slider 9 can be moved by the actuator arm 2 for relatively large displacements across the disk and can be moved by the piezoelectric actuators 4 for relatively small displacements.

Some significant disadvantages are inherent with this type of actuator arm. The primary disadvantage is out-of-plane movements which are imparted upon the slider 9 by the movement of the actuators 4. The out-of-plane motions are due to a deformation of the structure of the load beam 8 which occurs when the actuators 4 pull and push on the load beam 8. As a result, as the load beam 8 is moved and deformed by the actuators 4, the slider 9 is both moved across the disk surface and rolled to a certain degree. This rolling may cause one side of the slider to drop closer to the disk surface, which can cause a possible contact with the disk surface. As a result, such contact can damage the data tracks on the disk and decrease the disk drive's overall performance. Clearly, such damage and reduced performance must be avoided.

Another limiting factor to these microactuator designs is that the relatively short displacement stroke of the push-pull piezoelectric actuators arrangement results in limited displacement of the read/write head. As such, these microactuator designs are limited to track following operations and cannot seek data tracks on their own.

Thus, a device is sought which will provide sufficient and precise in-plane motion of the read/write head to augment the displacements from the VCM, allowing for the fine head positioning needed with smaller track widths.

SUMMARY OF THE INVENTION

The present invention is embodied in an actuator arm which utilizes microactuators to provide fine positioning of a read/write head to supplement larger displacements from a primary actuator. A read/write head is mounted to the actuator arm and is displaced by the microactuators along an at least nearly straight line transverse to the longitudinal axis of the actuator arm. This transverse motion allows the read/write head to be kept substantially within a plane parallel to the surface of the data storage disk. This is a great advantage as no out-of-plane motion is imparted on the read/write head during the fine actuation, thus avoiding damage due to possible contact between slider and the disk surface. Another advantage is provided by the use of bimorph actuators which provide greater displacements to the read/write head than the displacements typically achieved from use of piezoelectric actuators in a push-pull configuration. Still another advantage is achieved from the transverse motion imparted to the head from the microactuators, as the amount of lateral displacement of the head is no longer a function of microactuator's position along the actuator arm (as is the case with pivoting push-pull actuators in which the lateral head displacement is directly dependent on the distance between the actuators and the head). Since the displacement of the head is not adversely affected by the location of the microactuators on the actuator arm, the actuator arm can be made shorter, allowing the disk drive to be made more compact.

The actuator arm is attached to a primary actuator (e.g. a voice coil motor (VCM)) so the actuator arm and read/write head can be moved across the data storage disk. The actuator arm includes an inboard portion, an outboard portion and a pair secondary actuators. The secondary actuators are bimorph actuators. The inboard portion has a longitudinal axis and is attached to the primary actuator. The outboard portion has the read/write head mounted onto it. The pair of bimorph actuators are deflectable together in a common direction and are connected between the inboard and the outboard portions. Upon deflection of the bimorph actuators in the same direction, the outboard portion is translated along an at least nearly straight line transverse to the longitudinal axis of the inboard portion.

The outboard section can be moved to either side of the inboard portion. That is, the bimorph actuators can be deflected to cause the outboard section to translate to either side of the longitudinal axis of the inboard portion. The bimorph actuators can each include first and second piezoelectric layers. The layers are mounted longitudinally adjacent each other. Each actuator has electrical interfaces positioned to allow voltages to be applied to them. Thus, one layer is lengthened while the other is shortened, to cause the actuator to deflect in a direction towards the shortened layer. With the two bimorph actuators positioned substantially parallel to one another, a deflection in the same direction of both actuators will cause the outboard portion to move in a substantially linear direction. With the two bimorph actuators set at an angle (not parallel) to one another, the outboard portion will rotate as well as translate when moved by the actuators.

The actuator arm can be configured such that the read/write head is displaced to either side by at least the width of a single data storage track, or several tracks as needed. Also, the actuator arm can be configured such that the read/write head will be moved by the bimorph actuators substantially in a plane at least nearly parallel to the surface of the data storage disk.

The bimorph actuators can each have a first end and a second end, where the first end is mounted to the inboard portion of the actuator arm in a fixed manner to prevent rotation, and the second end is rotatably mounted to the outboard portion. This mounting allows the bimorph actuators to deform in a cantilever mode, and the outboard portion to translate along an at least nearly straight line transverse to the longitudinal axis. Alternatively, the first end can be rotatably mounted to the inboard portion and the second end can be mounted to the outboard portion in a fixed manner to prevent rotation. This alternate configuration also moves the outboard portion along an at least nearly straight line transverse to the longitudinal axis.

In one embodiment of the invention, the actuators are 's-shaped' bimorphs. With a s-shaped actuator the bimorph actuators each include an inboard portion and an outboard portion. Each of these portions has two piezoelectric layers mounted longitudinally adjacent to each other with opposite polarization. The inboard and outboard portions are aligned and positioned such that the arrangement of the piezoelectric layers of the inboard portion are the opposite of that of the outboard portion. Each actuator has electrical interfaces positioned to allow voltages to be applied to them. The actuators are therefore configured such that when a voltage is applied to each, the actuators deflect into s-shaped beams. With such s-shaped bimorph actuators, ends of the actuators are mounted in a fixed manner to prevent their rotation.

In another embodiment of the invention, each secondary actuator is a single layer of piezoelectric mounted along a support member of a bendable length of non-piezoelectric material. In this embodiment, the shortening or lengthening of the piezoelectric relative to the connected constant length bendable support member causes the combination to bend in one direction or the other. For example, as the piezoelectric is shortened, the bendable member will be bent in the direction of the piezoelectric and if the piezoelectric is lengthened, the bendable member will be bent in the direction away from the piezoelectric. This deformable material can be metal. The deformable material can also be part of the structure of the actuator arm, such that the deformable material will function both to support the actuator arm and as part of the actuators which can deflect the outboard portion of the actuator arm.

The actuator arm can also include a voltage source and a voltage controller for applying voltages across the electrical interfaces of the actuators. This application of a voltage allows each first layer to be deformed an equal amount and each second layer to be deformed an equal amount which is separate from that of the first layers. As such, the first layers are deformed differentially from the second layers to cause the bimorph actuators to bend.

In one embodiment, the actuator arm can include a support arm and a suspension assembly. The suspension assembly being attached to the support arm at a swage point. The suspension assembly including a base plate at the swage point and a load beam separate from the base plate and extending out therefrom. Between the base plate and the load beam are a substantially parallel pair of two-layer piezoelectric bimorph actuators deflectable together in a common direction. Upon deflection of the actuators in the same direction, the load beam (which carries the slider and magnetic head) is translated along an at least nearly straight line transverse to the longitudinal axis of the actuator arm. The load beam moving substantially in a plane at least nearly parallel to the substantially planar surface of the data storage disk.

DETAILED DESCRIPTION OF THE PREFERRED EMBODIMENTS

In the preferred embodiments of the present invention, the actuator arm utilizes microactuators to provide fine positioning of a read/write head to supplement the displacements of a primary actuator. The read/write head is displaced by the microactuators along an at least nearly straight line transverse to the longitudinal axis of the actuator arm. This transverse motion provides the advantage of keeping the read/write head substantially within a plane parallel to the surface of the data storage disk. The lack, or reduction, of out-of-plane motion, prevents damage to the slider and disk from possible contact between them, due to rolling caused by out-of-plane motions. Another advantage is that bimorph actuators are used provide greater displacements to the read/write head, allowing greater data track coverage. This provides the read/write head the ability to not only follow data tracks but also to seek tracks. Since no pivot arm is needed to move the read/write head about, still another advantage is that the actuator arm can be shortened, allowing the disk drive to be more compact.

Figure 1:
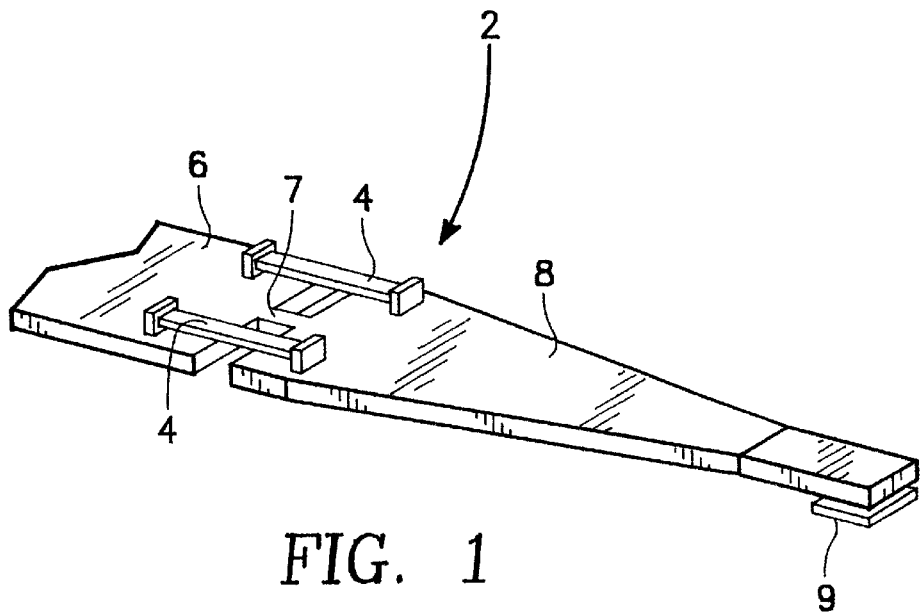
FIG. 1 is a perspective view of an actuator arm having a push-pull microactuator.
Figure 3:
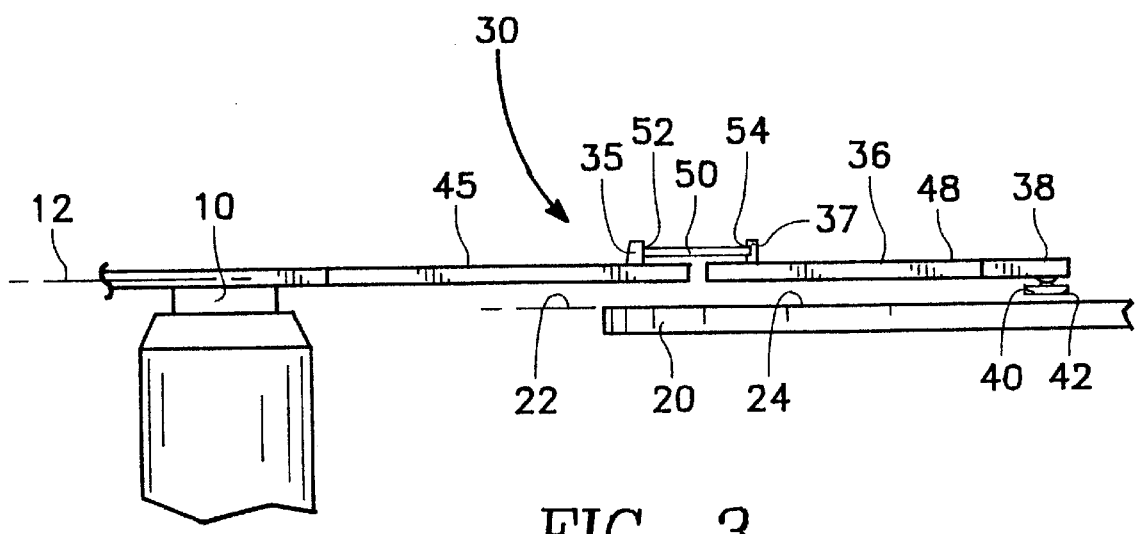
FIG. 3 is a side view showing the actuator arm with bimorph actuators.

In the preferred embodiments an actuator arm 30 mounted on a bearing 10, is moved through a displacement arc 44 above a data storage disk 20 by a voice coil motor (VCM) 11. These elements are shown in both FIG. 2 and FIG. 3.

The displacement arc 44 is sufficient to allow a read/write head 42 mounted at the outboard end of the actuator arm 30 to be positioned over the entire usable disk surface 24, as the disk 20 rotates. Allowing the read/write head 42 to be positioned above any desired data storage track 26. The width of the data storage tracks 26 are directly dependent upon the width of the read/write head 42.

The actuator arm 30 has a plane of rotation 12 which is substantially parallel to a disk plane 22, such that as the read/write head 42 is moved through the displacement arc 44, it is kept in a plane substantially parallel the disk plane 22. This keeps the read/write head 42 at a nearly constant distance relatively close above the disk surface 24. The VCM 11 acts as the primary actuator for moving the actuator arm 30. Movements of the read/write head 42 caused by the VCM 11 are relatively coarse as compared to the smaller, or fine, displacements imparted to the read/write head 42 by secondary actuators 50 and 60.

Figure 2:
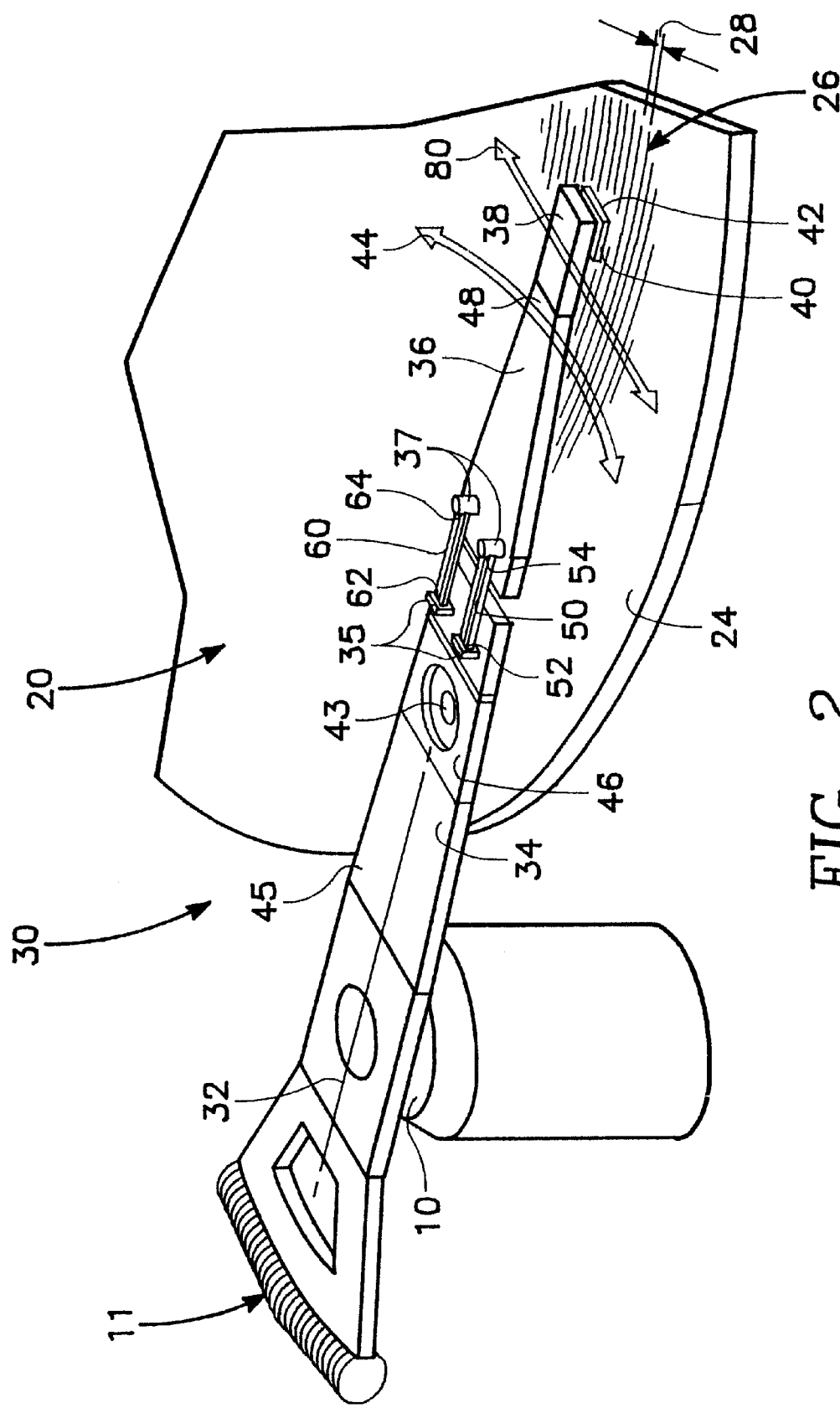
FIG. 2 is a perspective view showing the actuator arm with bimorph actuators.

As seen in FIG. 2, actuator arm 30 has a longitudinal axis 32 running along its length. The actuator arm 30 is mounted to the bearing 10 and extends outward therefrom over the disk surface 24, so to position the read/write head 42 over the disk surface 24. Several disks 20 and actuator arms 30 can be used together in a stack arrangement.

Actuator arm 30 is divided into an inboard portion 34 and an outboard portion 36, as seen in FIGS. 2–5. The inboard portion 34 is mounted to the bearing 10 and the VCM 11 such that can be moved about the bearing 10 by the VCM 11. The outboard portion 36 has an outboard end 38 from which a slider 40 is mounted. The separation between the inboard portion 34 and the outboard portion 36 can be placed anywhere between the bearing 10 and the slider 40. For instance, in one embodiment, the separation is set between a base plate 46 and load beam 48. Such that the inboard portion 34 includes a support arm 45 and base plate 46 and the outboard portion 36 includes a load beam 48.

The slider 40 is an air bearing slider which is positioned in the air flow existing just above the disk surface 24 when disk 20 is rotating. Slider 40 is shaped to provide a lifting force from the air flowing past it. This lifting force acts to keep the slider 40 at a nearly constant distance above the disk surface 24. Mounted in the slider 40 is the read/write head 42. The read/write head 42 operates to read data by detecting the magnetic poles on the disk 20 and to write data by re-aligning the poles.

The outboard portion 36 is separate from the inboard portion 34 such that the outboard portion 36 can be moved transversely, relative to the arm longitudinal axis 12, along a displacement path 80. This transverse motion is specifically shown in FIGS. 4 and 5. The transverse motion of the outboard portion 36 causes the read/write head 42 to be moved over one or more data storage tracks 26. This separate transverse head positioning provides a fine displacement of the read/write head 42 in addition to the relatively coarse positioning provided by the VCM 11.

The attachment of the outboard portion 36 to the inboard portion 34 can be carried out in a variety of different ways. In some embodiments of the present invention, the outboard portion 36 is mounted to the inboard portion by the first and second actuators 50 and 60.

In one embodiment, these actuators are bimorphs positioned substantially parallel to one another, as shown in FIGS. 2–5. The bimorphs are made of a piezoelectric laminate having a first piezoelectric layer 70 and a second piezoelectric layer 72. The first piezoelectric layer 70 and the second piezoelectric layer 72 are polarized in opposite directions such that one layer will contract and the other will expand when a voltage is applied. These bimorph actuators each have interfaces 74 to allow a voltage to be applied to them. The actuator arm 30 can include a voltage source 76 and a voltage controller 78 for applying a voltages across the electrical interfaces 74 of the bimorph actuators, as shown in FIG. 4A.

Figure 4A:
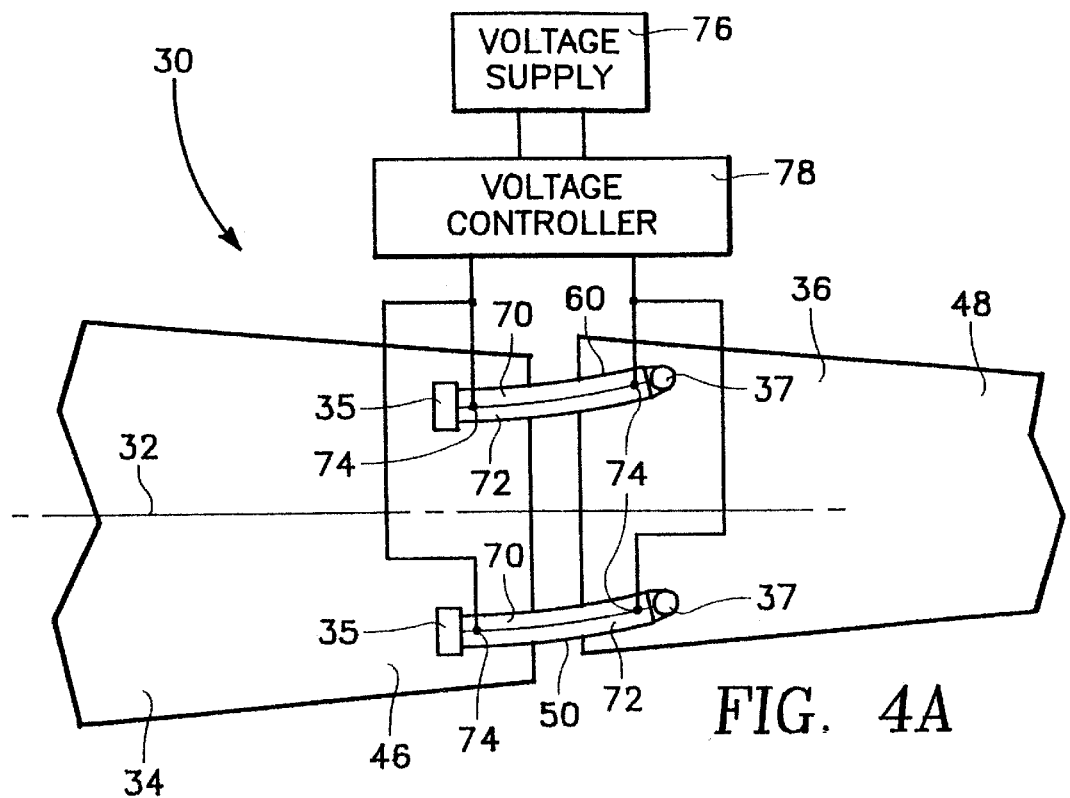
FIG. 4A is a top view of a portion of the actuator arm showing the bimorph actuators deflected in a first direction.
Figure 5:
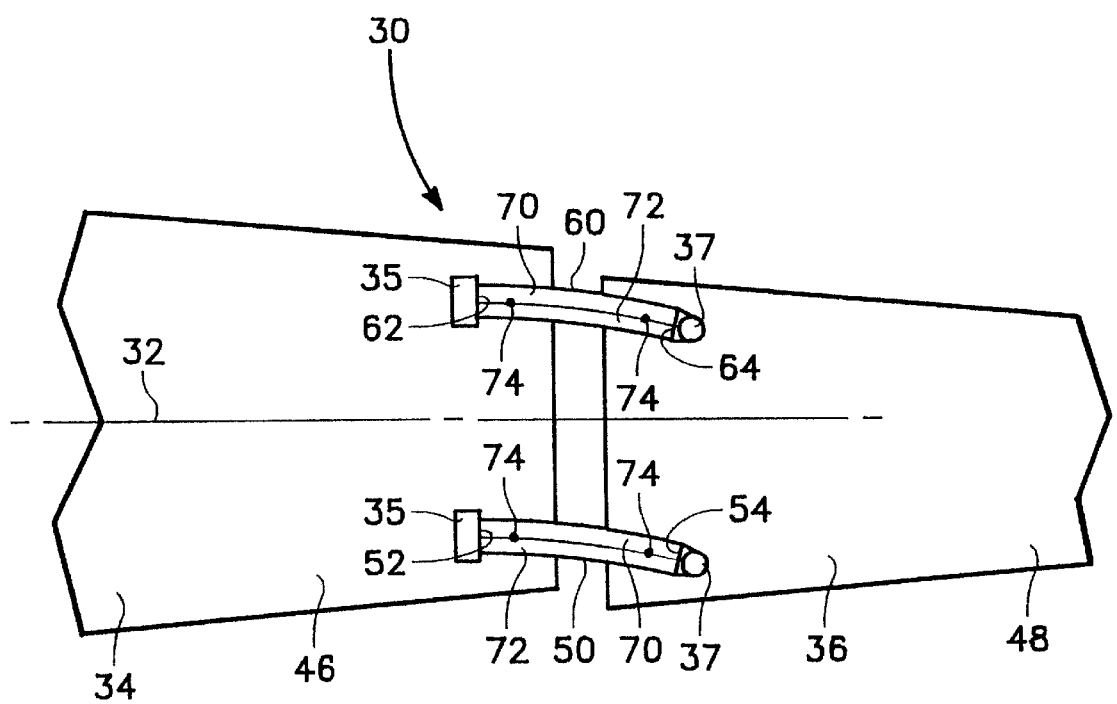
FIG. 5 is a top view of a portion of the actuator arm showing the bimorph actuators deflected in a second direction.

Thus, the actuators 50 and 60 are wired and controlled such that when one piezoelectric layer lengthens, the other shortens. That is, as a first voltage is applied to the bimorph actuators, the first piezoelectric layer 70 lengthens, and the second piezoelectric layer 72 shortens, in a manner well known to those skilled in the art. Since the two layers are connected together to form a single beam, the lengthening of one side and the shortening of the other causes the laminate beam to deform as a cantilever. The resulting deformation of the actuator beam is towards the shortened piezoelectric layer. That is, with the first layer 70 lengthened, and the second layer 72 shortened, the beam deflects in a direction towards the second layer 72, as shown in FIG. 4A. If instead, a second voltage is applied to the bimorph actuators, the first piezoelectric the first layer 70 is shortened and the second layer 72 lengthened, the actuator beam bends in the opposite direction towards the first piezoelectric layer 70, as shown in FIG. 5.

With these bimorph actuators mounted between the inboard portion 34 and the outboard portion 36 of actuator arm 30, and with the piezoelectric laminates orientated side-by-side and substantially along the length of the actuator arm 30 (e.g. aligned with the actuator arm longitudinal axis 32), the common deformation of the actuators in the same direction will cause the outboard portion 36 to move transverse to the arm longitudinal axis 32. For the outboard portion 36, and thus the read/write head 42, to move laterally along an at least nearly straight line, it is preferred that the first actuator 50 and the second actuator 60 have the same configuration (e.g. same overall undeflected length, same piezoelectric material, and the like), as well as being aligned parallel to each other. As shown in FIGS. 4 and 5, this allows the movement of the slider 40 and read/write head 42, to remain in a plane parallel with the disk plane 22, avoiding the out-of-plane motion associated with deformation of an outboard portion of a device having push-pull movement about a hinge. This in-plane displacement provides the benefit of maintaining a constant and level flight height of the slider 40 without imparting any roll which might cause damage from an edge of the slider 40 contacting the disk surface 24.

The bimorph actuators are each mounted to the inboard portion 34 at an inboard actuator support 35. Specifically, the first actuator 50 is attached to an inboard actuator support 35 at a first actuator inboard end 52, as shown in FIGS. 2–5. Likewise, the second actuator 60 is attached to an inboard actuator support 35 at a second actuator inboard end 62, as shown in FIGS. 2, 4 and 5. Also, the actuators are each attached to the outboard portion 36 at an outboard actuator support 37. The first actuator 50 is attached to the outboard portion 36 at a first outboard actuator end 54 to an outboard actuator support 37. The second actuator 60 is attached to the outboard portion 36 at a second outboard actuator end 64 to an outboard actuator support 37.

Since the bimorph actuators deform as a cantilever, to achieve a straight line transverse displacement of the outboard portion 36, one end of each actuator must be mounted in a fixed manner to prevent any rotation, and the opposing end must be attached at a pivot to allow rotation. One embodiment of this form of mounting is shown in FIGS. 2–5. Although either end of the actuators could be fixed with the opposing ends free to rotate, it is preferred that the first actuator inboard end 52 and the second actuator inboard end 62 each be rigidly attached to an inboard actuator support 35, such that the inboard ends of the actuators cannot rotate. It is also preferred that the first actuator outboard end 54 and second actuator outboard end 64 be attached to the outboard portion 36 at outboard actuator support 37 in a manner which allows them to rotate about the attachment, so to allow the actuators bending together as cantilevers to displace the outboard portion 36 to one side or the other, as shown in FIGS. 4 and 5.

One advantage to using a two bimorph actuator arrangement for displacing the outboard portion 36 is that by operating as cantilever beams, the piezoelectric elements provide a greater displacement to the outboard portion 36 than the displacements which would be obtained orienting the piezoelectric elements in a push-pull manner and rotating the outboard portion about a pivot or hinge.

Because the displacement imparted upon the outboard portion 36 by the actuators 50 and 60 is substantially linear and not rotational, the actuator pair can be placed at nearly any position along the length of the actuator arm 30. That is, the displacement of the read/write head 42 will be generally the same whether the actuators are placed near the bearing 10, at the middle of the actuator arm 30, or near the outboard end 38. Nevertheless, as noted, the actuators 50 and 60 can be placed between the base plate 46 and the load beam 48, as shown in FIGS. 2–5. This location is preferred as in most actuator arm designs the base plate 46 is the typical point of connection to a support arm 45 of the actuator arm 30. The base plate 46 is connected to the support arm 45 at the swage 43. The load beam 48 extends outward from base plate 46 to its attachment with slider 40. It is common to manufacture a suspension assembly having a base plate and a load beam element, separately from the manufacture of the support arm and then attach the suspension assembly to the support arm at a swage point during the final stages of assembly of the actuator arm. As such, it is preferred that in order to simplify manufacturing, that the actuators 50 and 60 be positioned between the base plate 46 and the load beam 48.

Nevertheless, the actuators can be placed at any of a variety of locations along the length of the actuator arm 30. This is possible because the displacement provided by the actuators is translational, as opposed to rotational, and thus the displacement imparted to the read/write head 42 will be the same regardless of the position of the actuators along the length of the actuator arm 30.

In one embodiment, one or more additional bimorph actuators are added to operate along with the first and second actuators 50 and 60. The added actuators are placed in parallel with the first two and are of the same length and have the same deformation.

Although, as noted herein, it is preferred that the outboard portion 36 be translated along an at least nearly straight line when the bimorph actuators 50 and 60 are deflected, the actuators can be configured to also impart some rotation to the outboard portion 36. This can be achieved in many ways including positioning the two actuators so that they are not parallel to one another or altering the deformation of the piezoelectric layers of the actuators.

Figure 4B:
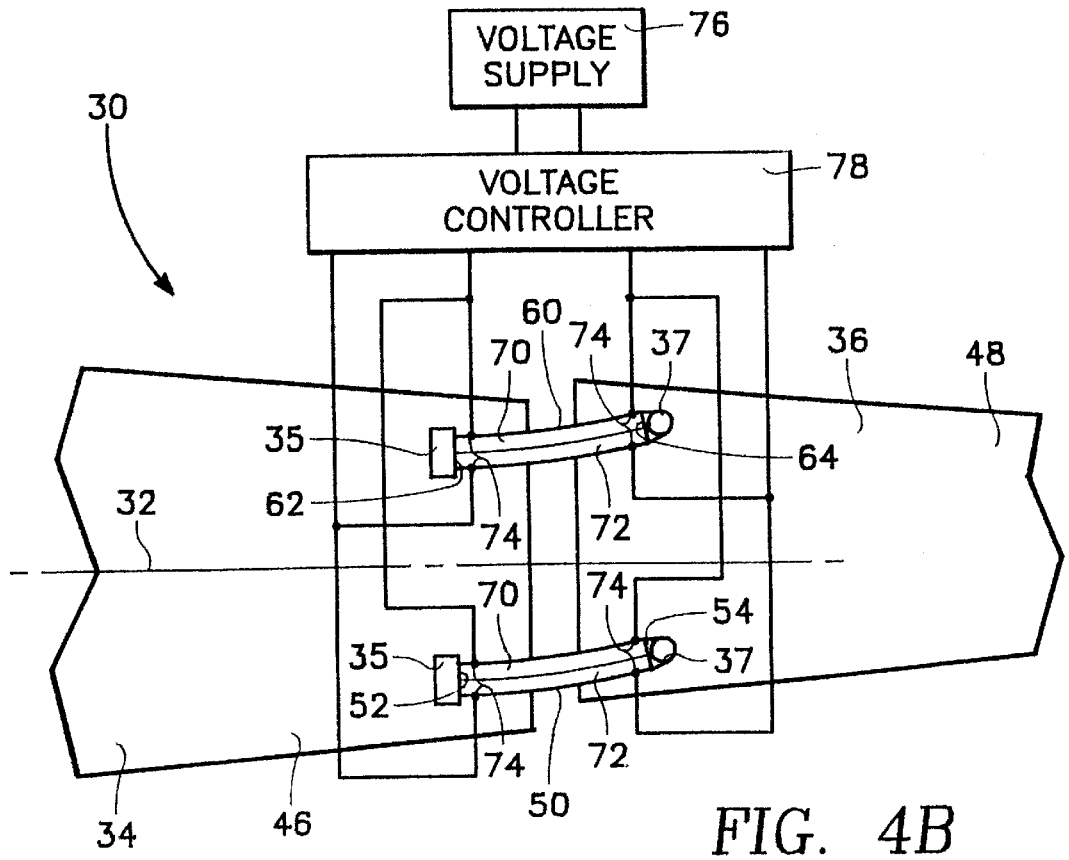
FIG. 4B is a top view of a portion of the actuator arm showing the bimorph actuators deflected in a first direction.

In one embodiment, in place of using oppositely polarized piezoelectric layers, similarly polarized layers that have separate voltages applied to each layer is used. These piezoelectric elements each have interfaces 74 to allow a voltage to be applied to each them separately, as shown in FIG. 4B. The voltage source 76 and voltage controller 79 to apply a first voltage across the electrical interfaces 74 of the first piezoelectric layers, and a second voltage across the electrical interfaces 74 of the second piezoelectric layers. Thus, the layers are wired and controlled such that when one layer lengthens, the other shortens. That is, as a voltage is applied to the first piezoelectric layer 70 to cause it to lengthen, a separate voltage is applied to the second piezoelectric layer 72 to cause it to shorten, in a manner well known to those skilled in the art. Since the two layers are connected together to form a single beam, the lengthening of one side and the shortening of the other causes the laminate beam to deform in a cantilever mode. The resulting deformation of the actuator beam is towards the shortened piezoelectric layer.

Figure 6:
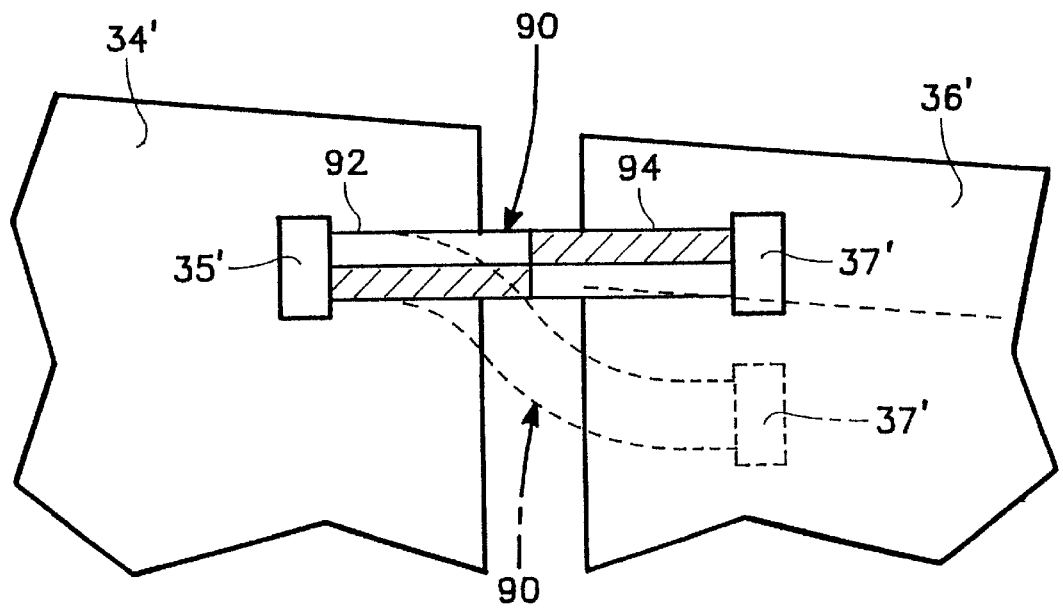
FIG. 6 is a top view of a s-shape actuator shown with potential displacement in one of two separate directions.

In place of a two layer bimorph actuator, a 'S-shaped' bimorph can be used in another embodiment of the invention. As shown in FIG. 6, the s-shaped bimorph 90 is a layered piezoelectric element that deforms into a s-shaped beam in either of two directions. The s-shaped bimorph 90 has a two layer inboard section 92 and a two layer outboard section 94. Each of these sections has two piezoelectric layers mounted longitudinally adjacent each other and polarized opposite to each other. The inboard and outboard sections are aligned and positioned such that the arrangement of the piezoelectric layers of the inboard section 92 are the opposite of that of the outboard portion 94. Each actuator 90 has electrical interfaces 96 positioned to allow voltages to be applied to them. The actuators 90 are therefore configured such that when a voltage is applied to each, the actuators 90 deflect into s-shaped beams. In this configuration the s-shaped bimorph deforms the inboard section 92 in a curve opposite of the deformation curve of the outboard section 94. With such s-shaped bimorph actuators, both ends of the actuators 90 are mounted in a fixed manner to prevent their rotation. With two s-shaped bimorphs 90 placed between the inboard section 34' and the outboard section 36' of actuator arm 30', in a substantially parallel configuration, the outboard portion can be translated along at least a nearly straight line as is achieved with using the cantilever deforming bimorph actuators 50 and 60.

Figure 7:
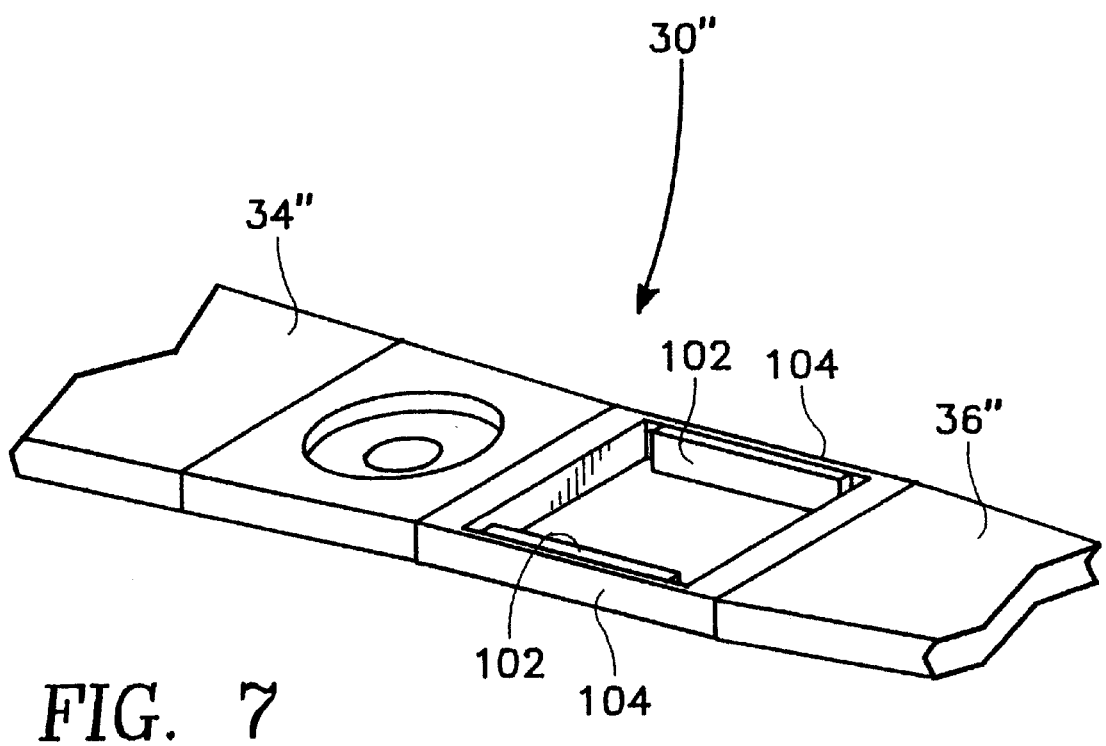
FIG. 7 is a perspective view showing the actuator arm with monomorph actuators.

As shown in FIG. 7, in another embodiment of the invention, each secondary actuator can be a monomorph actuator 100. The monomorph is a single layer of piezoelectric material 102 mounted along a support member of a bendable length of non-piezoelectric material 104. In this embodiment, the shortening or lengthening of the piezoelectric member 102 relative to the connected constant length bendable member 104 causes the combination to bend in one direction or the other. For example, as the piezoelectric member 102 is shortened, the bendable member will be bent in the direction of the piezoelectric member 102 and if the piezoelectric member 102 is lengthened, the bendable member 104 will be bent in the direction away from the piezoelectric. This deformable material can be metal. As shown in FIG. 7, the deformable material can also be part of the structure of the actuator arm 30", such that the deformable member 104 functions both to support the actuator arm 30" and as a portion of the actuator 100, deflecting the outboard portion 36" of the actuator arm relative to the inboard portion 34". In such an embodiment the inboard portion 34" and the outboard portion 36" are connected by the two bendable members 104. The piezoelectric members 102 could be placed on either side of the bendable members 104. With both the piezoelectric members 102 placed on the same side of the bendable members 104, then the piezoelectric members 102 are both deflected in the same direction (e.g. both lengthen) and by the same amount to get the actuators 100 to both deflect in the same direction. With the piezoelectric members 102 on opposite sides of the bendable members 104, as shown in FIG. 7, then the piezoelectric members 102 are deflected the opposition to each other (e.g. one lengthened and one shortened) to cause the monomorph actuators 100 to deflect in the same direction. Of course, the monomorph actuator could also be used in place of the cantilever bimorphs described herein.

While the invention has been described in detail by specific reference to preferred embodiments, it is understood that the above description is not limiting of the disclosed invention and variations and modifications thereof may be made without departing from the true spirit and scope of the invention.

What is claimed is:

1. An actuator arm mounted to a primary actuator for positioning a read/write head relative to a data storage disk, said arm comprising:
    an inboard portion attached to said primary actuator and including a base plate and a longitudinal axis;
    an outboard portion attached to said read/write head; and
    a pair of secondary monomorph actuators connected between said inboard portion and said outboard portion and deflectable together in a common direction to translate said outboard portion along an at least nearly straight line transverse to the longitudinal axis of said inboard portion.

2. The actuator arm of claim 1, wherein said monomorph actuators each comprise a piezoelectric layer and a bendable support layer.

3. An actuator arm mounted to a primary actuator for positioning a read/write head, the arm comprising:
    an inboard portion attached to the primary actuator and including a first top surface defining a top plane;
    an outboard portion discrete from the inboard portion and including the read/write head;
    two substantially parallel bendable support members extending between the inboard and outboard portions, each support member including a surface defining a plane that is substantially perpendicular to the top plane; and
    an actuator mounted to the surface of each support member.

4. The actuator arm of claim 3 wherein the support members are made of a non-piezoelectric material and each actuator includes a single layer of a piezoelectric material.

5. The actuator arm of claim 3 wherein the surface of each support member to which the actuator is mounted is an interior surface.

6. The actuator arm of claim 3 wherein the surface of each support member to which the actuator is mounted is an exterior surface.

7. An actuator arm mounted to a primary actuator for positioning a read/write
    head relative to a data storage disk, comprising:
    a support arm;
    a suspension assembly mounted to the support arm by a base plate and including
        an inboard portion connected to the base plate, and
        a load beam having the read/write head mounted thereto and connected to the inboard portion by only first and second support members having
            a first secondary monomorph actuator attached to the first support member and
            a second secondary monomorph actuator attached to the second support member.

8. The actuator arm of claim 7 wherein the inboard portion includes a top surface defining a first plane, and the load beam includes a top surface that is substantially coplanar with the first plane.

9. The actuator arm of claim 8 wherein the inboard portion includes a bottom surface defining a second plane, the load beam includes a bottom surface that is substantially coplanar with the second plane, and the pair of secondary monomorph actuators is disposed between the first and second planes.

10. An actuator arm mounted to a primary actuator for positioning a read/write head relative to a data storage disk, comprising:
    a support arm;
        a suspension assembly mounted to the support arm by a base plate and including
            an inboard portion connected to the base plate, and
            a load beam having the read/write head mounted thereto and connected to the inboard portion by
            an integral middle portion having a pair of secondary monomorph actuators.

11. The actuator arm of claim 10 wherein the middle portion includes a generally rectangular aperture.

12. The actuator arm of claim 11 wherein the middle portion further includes first and second support members disposed on either side of the aperture.

* * * * *